Figure 1:
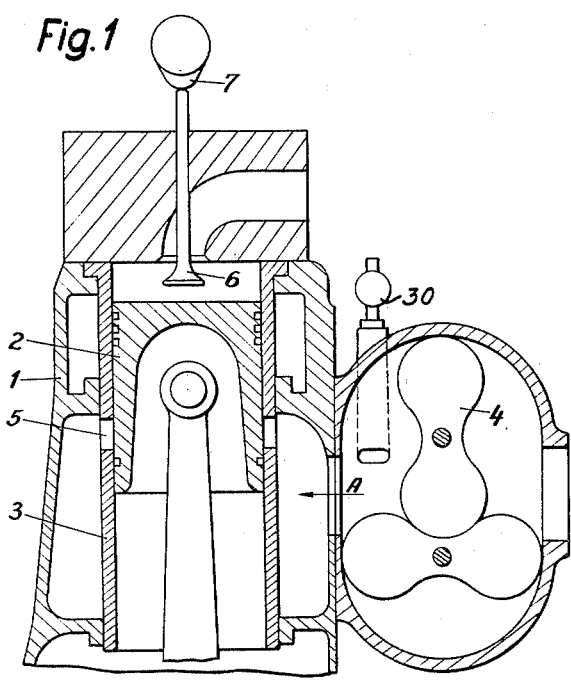

April 5, 1955  W. CAMBEIS ET AL  2,705,480

TWO-STROKE-ENGINE

Filed Sept. 25, 1952

Inventors:
Walter Cambeis
and
Kurt Haase
By Walter Burles
Patent Agent

United States Patent Office 2,705,480
Patented Apr. 5, 1955

2,705,480

TWO-STROKE-ENGINE

Walter Cambeis, Essen-Bredeney, and Kurt Haase, Essen, Germany, assignors to Sudwerke Motoren- und Kraftwagenfabriken G. m. b. H., Essen, Germany Application September 25, 1952, Serial No. 311,432

Claims priority, application Germany September 27, 1951

5 Claims. (Cl. 123—65)

The invention relates to two-stroke engines having uniflow scavenging, in which the scavenging air is blown into the cylinder through slots and is blown out through outlet valves situated in the cylinder head and controlled by a camshaft. Engines of this kind are installed to an increasing extent in heavy trucks and buses. Brakes operating by friction, as have heretofore been customary, are no longer sufficient for such heavy vehicles, in particular for trucks with trailers, as they are not capable of providing the braking power which is necessary for long steep descents and also do not afford the necessary reliability in operation. Also the usual engine-braking according to which the engine is driven by the vehicle wheels is no longer sufficient for modern requirements.

The invention leads to a new method by which, in the case of heavy vehicles which are equipped with two-stroke engines of the kind mentioned above, and by the use of simple and reliable means, braking effects of any desired magnitude may be attained without leading to an undesirable accumulation of heat or over-running of the engine. This is achieved primarily by making it possible to turn the rotating members which control the oulet, e. g. the cam shaft actuating the outlet valves, during their rotation, and to regulate solely as a result of this turning movement the beginning of the opening movement of the outlet members within a range which extends from the normal beginning of the opening movement to at least approximately the top dead centre. The invention is in fact based on the finding that it is possible to convert a two-stroke engine of the kind mentioned above into a controlled two-stroke compressor with very little constructional change. Control is effected in such a way that, according to the power of the braking action that is required, the beginning of the opening movement of the outlet members is moved more or less to the top dead centre, so that the braking action can be regulated in an infinitely variable manner. The maximum braking effects are obtained if the opening of the outlet members takes place at such a point in time that at the end of each compression stroke the compressed air almost completely escapes and therefore does no work during the subsequent downward movement of the piston. The work of compression performed by the piston then appears almost completely in the form of braking effort, the heat produced during compression being carried away again by the escaping air.

The invention is not only applicable to two-stroke engines having outlet valves and camshafts, but also to two-stroke engines in which a rotary valve is provided in each cylinder head as the outlet member for the scavenging air. In the latter case, if it is desired to brake, the rotary valve is turned during its rotation in such a way that it begins to open near the top dead centre. The application of the invention to two-stroke engines having a rotary valve gear leads to the advantage that the displacement of the beginning of the opening movement to near the top dead centre or before it is easier to carry out than when outlet valves are used, with which, in view of the small dangerous space which is necessarily present, special constructional measures are required in order to avoid impact between the piston as it passes through the top dead centre and the inwardly-opening valve head.

On the other hand the application of the invention to a two-stroke engine having outlet valves and camshaft has its own advantage. It has been found that the turning of the camshaft, which is effected by means of a handle to be operated by the driver, is only possible when the engine is running, for when the engine is stopped, the pressure exerted by the valve springs, through the valve stems upon the cams causes too great a resistance to the turning of the camshaft. If, therefore, at the end of a descent, during which the camshaft is in the braking position, the vehicle is brought to a standstill and the engine stopped with the gear in mesh, the camshaft can no longer be turned by hand out of its braking position into the running position. The effect of a parking brake is thus obtained without taking further action. Even if the driver on leaving the vehicle has forgotten to put on the handbrake, or if the hand-brake is out of action, the vehicle, once stopped, cannot start even on a steep road thanks to the braking position of the camshaft. This means a considerable lessening of the danger of accidents.

Figure 1A:
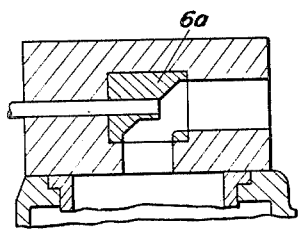
Figure 2:
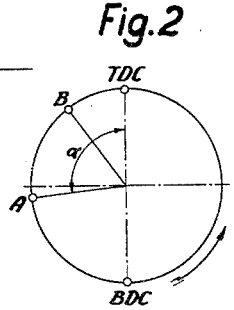

In order to turn the camshaft or rotary valve during rotation, means known per se may be employed. One of the various possible ways of carrying the invention into effect, and employing a camshaft, will be explained by way of example and with reference to the drawing. In the drawing Fig. 1 is a section through an engine of the kind to which the invention is to be applied. Fig. 1a shows a section of a cylinder head, the outlet part of which is controlled by a rotary valve. Fig. 2 is a timing diagram, and Fig. 3 shows partly in section a device for turning the camshaft of the engine.

In Fig. 1, 1 denotes a cylinder of the engine, 2 the piston, 3 the liner of the cylinder and 4 the blower for the scavenging air. The blower supplies the scavenging air in the direction indicated by the arrows and forces it through the slots 5 in the liner 3 into the cylinder when the piston 2 has opened the slots on its downward movement. The scavenging air then escapes, during normal working of the engine, in uniflow through the outlet valve 6 situated in the cylinder head, which valve is controlled by a cam 7 on the camshaft.

In Fig. 1a, the reference 6a designates a rotary valve which acts as discharge control valve and is rotated during operation of the engine. As shown in Fig. 3, the camshaft 8 has an extension 9, on which a sleeve 10 is displaceably mounted. A key 11 prevents the sleeve 10 from rotating with respect to the shaft 9. The sleeve 10 has a multi-start quick-pitch screw thread 12 which engages with a corresponding internal screw thread in a toothed wheel 13. This wheel is mounted in the casing 14 so as to be incapable of axial displacement and is driven by a toothed wheel 15 which is itself driven from the crank-shaft. The sleeve 10 has at its free end an annular groove 16, in which engages a forked lever 18 pivotally supported at the point 17.

Figure 3:
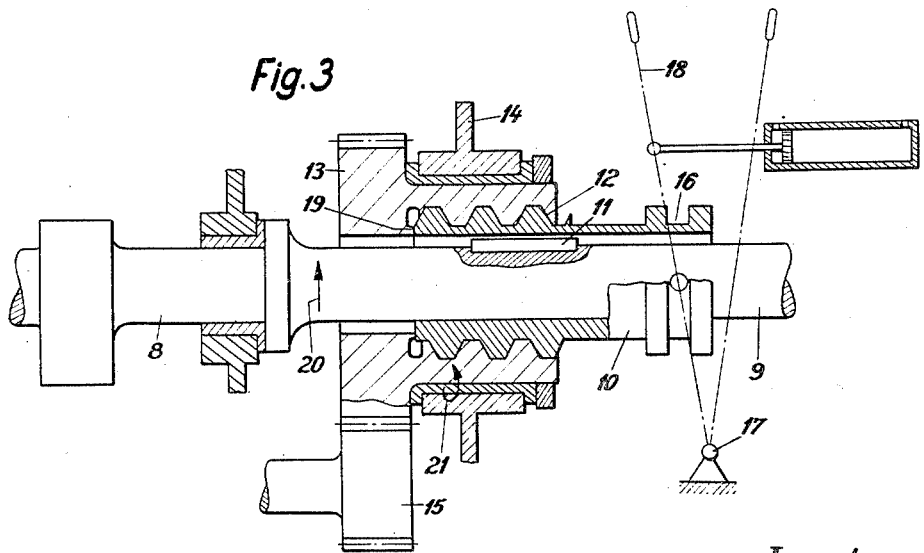

In the position of the sleeve 10 illustrated in Fig. 3, the left-hand end face of the sleeve lies against an abutment 19 on the toothed wheel 13. This position corresponds to normal running of the engine. If braking is to be effected, the lever 18 is swung to the right, as a result of which the sleeve 10 is partly drawn out of the internal thread of the toothed wheel 13 and the camshaft 8 is turned, while rotating, by an amount corresponding to the pitch of the thread. The direction of rotation of the camshaft 8 is indicated by the arrow 20. The toothed wheel 13 also rotates in the same direction. See the arrow 21.

The pitch of the thread 12 is preferably made such that the rotating toothed wheel 13 tends to push the sleeve 10 towards the left, that is to move it over from the braking position into the normal running position illustrated in Fig. 3. This leads to the following advantage. If the engine had been stopped while the camshaft was in its braking position, the camshaft will, when the engine is restarted, be immediately moved over into the running position by the toothed wheel which is set in motion by the crankshaft. The driver is therefore saved the trouble, when starting the engine, of turning the camshaft into the running position.

When a two-stroke engine operates as a compressor, after the camshaft or the rotary valve has been turned in accordance with the invention, the scavenging air pressure increases, for then the outlet slots are closed for the greater part of the time during which the scavenging-air inlet slots are open, and the scavenging air blower does not cause the air to pass through the cylinder but forces it into the cylinder. Consequently the torque needed to drive the scavenging air blower, and thus the braking torque, increases. However in order that the pressure should not increase beyond the permissible value and possibly lead to damage to the blower, it is preferable to incorporate in the pressure pipe of the blower a pressure-release valve (see valve 30 in Fig. 1) which keeps the air pressure within permissible limits.

It is preferred to couple the means for turning the camshaft with the fuel supply in such a way that when the camshaft is turned into the braking position the supply of fuel to the cylinders is cut off. It is advantageous to employ hydraulic or pneumatic means for turning the camshaft or the rotary valve, e. g. by effecting the displacement of the aforesaid sleeve by means of a piston acted upon by pressure oil or compressed air.

In the crank circle diagram of Fig. 2 T. D. C. is the top dead centre, and B. D. C. is the lower dead centre. The arrow indicates the direction of rotation of the engine.

During the normal working of the engine as a prime mover the opening of the outlet member 6 begins at the point A, which may for example be at about 85° before bottom dead centre (B. D. C.) shortly before opening the slots 5 by the piston 2 on its downward movement.

By the above mentioned turning of the cam 7 the beginning of the opening movement of the outlet valve 6 can be displaced e. g. to the top dead centre T. D. C., so that at the end of the compression stroke the valve is opened and the compressed air escapes. Thus an effective braking is obtained. But it is also possible to regulate the braking action in an infinitely variable manner by displacing the beginning of the opening movement of the outlet valve not to the top dead centre T. D. C., but for example to the point B. The braking action is then the less, the more the point B is remote from T. D. C. Thus the braking effect can be regulated in an infinitely variable manner within a range, characterized by the angle $a$ in Fig. 2.

What we claim is:

1. A two stroke cycle internal combustion engine with uniflow scavenging for vehicles, which comprises in combination: a cylinder having an air inlet port for admitting scavenging air and having an air outlet port for exhausting scavenging air, valve means operable to control said air outlet port, rotatable control means arranged for controlling said valve means, and adjusting means operatively connected to said control means and operable rotatably to adjust said control means during rotation thereof by a desired angle up to approximately 90°, thereby, for the purpose of braking the vehicle, allowing variation of the start of the opening of said valve means within a range extending from its normal opening point to approximately upper dead center.

2. A two stroke cycle internal combustion engine with uniflow scavenging for vehicles, which comprises in combination: a cylinder having an air inlet port for admitting scavenging air and having an air outlet port for exhausting scavenging air, valve means operable to control said air outlet port, a rotatable cam shaft arranged for controlling said valve means, means arranged to prevent longitudinal movement of said cam shaft, and adjusting means operatively connected to said control means during rotation thereof by a desired angle up to approximately 90°, thereby, for the purpose of braking the vehicle allowing variation of the start of the opening of said valve means within a range extending from its normal opening point to approximately upper dead center.

3. A two stroke cycle internal combustion engine with uniflow scavenging for vehicles, which comprises in combination: a cylinder having an air inlet port for admitting scavenging air and having an air outlet port for exhausting scavenging air, rotatable valve means operable to control said air outlet port, and adjusting means adapted rotatably to adjust said valve means during a rotation thereof by a desired angle in order, for the purpose of braking the vehicle, to allow variation of the start of the opening of said valve means within a range extending from its normal opening point to approximately upper dead center.

4. A two stroke cycle internal combustion engine with uniflow scavenging for vehicles, which comprises in combination: a cylinder having an air inlet port for admitting scavenging air and also having an air outlet port for exhausting scavenging air, valve means operable to control said air outlet port, rotatable control means operable to control said valve means, power conveying means for conveying driving power to said control means, coupling means adapted drivingly to connect said power conveying means with said control means, said coupling means comprising a first threaded member adapted to be movable in axial direction during rotation of said control means thereby rotatably adjusting said control means by a desired angle up to approximately 90° in order, for the purpose of braking the vehicle, to allow variation of the start of the opening of said valve means within a range extending from its usual opening point to approximately upper dead center, said coupling means comprising a second threaded member meshing with said first threaded member, and means preventing said second threaded member from moving in axial direction of said first threaded member, the pitch and direction of thread of said threaded members being such that said second threaded member has the tendency in response to a rotation thereof to adjust said control member from a position corresponding to the opening outside said normal opening point to a position for opening said valve means at its normal opening point.

5. A two stroke cycle internal combustion engine with uniflow scavenging for vehicles, which comprises in combination: a cylinder having an air inlet port for admitting scavenging air and having an air outlet port for exhausting scavenging air, scavenging air furnishing means communicating with said air inlet port, pressure relief means operatively connected with said scavenging air furnishing means and adapted in response to a predetermined pressure to release air under pressure from said air furnishing means to the outside thereof to prevent undue pressure in said cylinder, valve means operable to control said outlet port, rotatable control means arranged for controlling said valve means, and adjusting means operatively connected to said control means and operable rotatably to adjust said control means during rotation thereof by a desired angle up to approximately 90°, thereby, for the purpose of braking the vehicle allowing variation of the start of the opening of said valve means within a range extending from its normal opening point to approximately upper dead center.

References Cited in the file of this patent

UNITED STATES PATENTS

| Number | Name | Date |
|---|---|---|
| 876,020 | Salter | Jan. 7, 1908 |
| 1,044,289 | Taylor | Nov. 12, 1912 |
| 1,745,824 | Zoller | Feb. 4, 1930 |
| 1,826,638 | Schwerdtfeger | Oct. 6, 1931 |
| 2,057,354 | Withers et al. | Oct. 13, 1936 |
| 2,148,854 | Bokemuller | Feb. 28, 1939 |
| 2,178,152 | Walker | Oct. 31, 1939 |

FOREIGN PATENTS

| Number | Country | Date |
|---|---|---|
| 159,923 | Germany | Apr. 14, 1905 |